US006926970B2

(12) United States Patent
James et al.

(10) Patent No.: US 6,926,970 B2
(45) Date of Patent: Aug. 9, 2005

(54) APPARATUS AND METHOD FOR FORMING WELD JOINTS HAVING COMPRESSIVE RESIDUAL STRESS PATTERNS

(75) Inventors: Michael Royston James, Thousand Oaks, CA (US); Murray W. Mahoney, Camarillo, CA (US); Douglas J. Waldron, Fountain Valley, CA (US); Paul S. Prevey, III, Cincinnati, OH (US)

(73) Assignees: The Boeing Company, Chicago, IL (US); Lambda Research, Inc., Cincinnati, OH (US)

( * ) Notice: Subject to any disclaimer, the term of this patent is extended or adjusted under 35 U.S.C. 154(b) by 236 days.

(21) Appl. No.: 10/286,489

(22) Filed: Nov. 1, 2002

(65) Prior Publication Data

US 2003/0085257 A1 May 8, 2003

Related U.S. Application Data

(60) Provisional application No. 60/335,739, filed on Nov. 2, 2001.

(51) Int. Cl.[7] .......................... B32B 15/01; B23K 20/12
(52) U.S. Cl. .................................. 428/615; 228/112.1
(58) Field of Search .............................. 228/112.1, 2.1, 228/155, 199; 29/90.01; 72/75, 377; 428/344, 615; 148/558

(56) References Cited

U.S. PATENT DOCUMENTS

| | | | |
|---|---|---|---|
| 1,784,866 | A | 12/1930 | Fahrenwald |
| 3,324,698 | A | 6/1967 | Paulet, Jr. et al. |
| 3,494,013 | A | 2/1970 | Gottschald |
| 3,770,595 | A | 11/1973 | Cros et al. |
| 3,820,210 | A | 6/1974 | Kalen |
| 4,118,846 | A | 10/1978 | Korte |
| 4,132,098 | A | 1/1979 | Culver et al. |
| 4,246,684 | A | 1/1981 | Barker |

(Continued)

FOREIGN PATENT DOCUMENTS

| | | | |
|---|---|---|---|
| EP | 41248 | | 12/1981 |
| EP | O 353376 B1 | | 2/1990 |
| EP | 1 057 575 A2 | | 12/2000 |
| EP | 1 151 820 A2 | | 11/2001 |
| FR | 002662623 A1 | | 12/1991 |
| GB | 1 217 803 A | | 12/1970 |
| GB | 2 154 492 A | | 9/1985 |
| JP | 62-292362 A | | 12/1987 |
| JP | 02003266181 A | * | 9/2003 |
| WO | WO 01/20534 A1 | | 3/2001 |
| WO | WO 01/64398 A2 | * | 9/2001 |
| WO | WO 03/082512 A1 | * | 10/2003 |
| ZA | 8103064 A | | 3/1982 |

OTHER PUBLICATIONS

International Search Report, EPO, mailed Feb. 19, 2003.
Russell et al.; *Analytical Modelling of Microstructure Development in Friction Stir Welding*; published at First International Conference of Friction Stir Welding, Jun. 14, 1999.
Lumsden, III, et al.; *Stress Corrosion Susceptibility in 7050 T7541 Aluminum Following Friction Stir Welding*; published at First International Conference of Friction Stir Welding, Jun. 14, 1999.

(Continued)

*Primary Examiner*—Kiley S. Stoner
(74) *Attorney, Agent, or Firm*—Alston & Bird LLP (57) ABSTRACT

The welding apparatus and associated method are provided. The welding apparatus includes a welding tool for forming a weld joint along the surface of at least one workpiece. The welding apparatus also includes a compression tool for selectively inducing a layer of residual compressive stress in at least a portion of the surface of the weld joint and the surface of the at least one workpiece to thereby improve the material properties of the workpiece, including corrosion resistance and fatigue strength.

29 Claims, 6 Drawing Sheets

U.S. PATENT DOCUMENTS

| | | | |
|---|---|---|---|
| 4,360,143 A | 11/1982 | Beckman et al. | |
| 4,509,351 A | 4/1985 | Rolin et al. | |
| 4,565,081 A | 1/1986 | Massee | |
| 4,821,388 A | 4/1989 | Okumura et al. | |
| 4,922,739 A | 5/1990 | Ostertag | |
| 4,947,668 A | 8/1990 | Ostertag | |
| 4,947,688 A | 8/1990 | Yagawara et al. | |
| 5,099,558 A | 3/1992 | Wilson | |
| 5,329,684 A | 7/1994 | Budet et al. | |
| 5,460,317 A | 10/1995 | Thomas et al. | |
| 5,643,055 A | 7/1997 | Linzell | |
| 5,666,841 A | 9/1997 | Seeger et al. | |
| 5,737,385 A | 4/1998 | Prevey, III et al. | |
| 5,826,453 A | 10/1998 | Prevey, III | |
| 6,338,765 B1 * | 1/2002 | Statnikov | 148/558 |
| 6,415,486 B1 * | 7/2002 | Prevey, III | 29/90.01 |
| 6,537,682 B2 * | 3/2003 | Colligan | 428/593 |
| 6,622,570 B1 * | 9/2003 | Prevey, III | 73/826 |
| 6,698,268 B2 * | 3/2004 | Woods et al. | 72/412 |
| 6,742,377 B2 * | 6/2004 | Woods et al. | 72/412 |
| 2001/0054639 A1 * | 12/2001 | Gabzdyl | 228/112.1 |
| 2002/0043313 A1 * | 4/2002 | Statnikov | 148/558 |
| 2002/0121319 A1 * | 9/2002 | Chakrabarti et al. | 148/694 |
| 2002/0174528 A1 * | 11/2002 | Prevey, III | 29/90.01 |
| 2003/0085257 A1 * | 5/2003 | James et al. | 228/112.1 |
| 2003/0172706 A1 * | 9/2003 | Woods et al. | 72/325 |
| 2003/0172707 A1 * | 9/2003 | Woods et al. | 72/325 |

OTHER PUBLICATIONS

Tools for Roller Burnishing, Deep Rolling, Forming, published by W. Hegenscheidt GMBH, Celle, Germany, May, 1991.

Tools for Roller Burnishing, Deep Rolling, Forming, published by Ecoroll AG Werkzeugtechnik, Celle, Germany, Apr. 1996.

Operating Instuctions Nr. 141293E/4 Hydraulic Pump Unit HGP3.0, published by Ecoroll AG Werkzeugtechnik, Celle, Germany, Aug. 3, 1996. (First published in German language on Dec. 14, 1993. The number in the title, 141293, is the date first published and the E stands for English language version. The /4 stands for this being the $4^{th}$ edition.)

Operating Instructions No. 080592E/3 Hydrostatic Roller Burnishing Tool HG4–, HG6–, HG13–9, published by Ecoroll AG Werzeugtechnik, Celle, Germany, Oct. 10, 1996. (First published in German language on May 8, 1992. The number in the title, 080592, is the date first published and the E stands for English language version. The /3 stands for this being the $3^{rd}$ edition.)

Tooling Technology Division, Working Example 501/HG, published by W. Hegenscheidt GMBH, Celle, Germany, May 14, 1991.

Tooling Technology Division, Working Example 502/HG, published by W. Hegenscheidt GMBH, Celle, Germany, May 14, 1991.

Cyclic deformation and near surface microstructures of shot peened or deep rolled austenitic stainless steel AISI 304, Authors I. Altenberger, B. Scholtes, U. Martin, H. Oettel, submitted Nov. 13, 1998, published by Material Science and Engineering A264 (1999).

Deep Rolling, Versatile and Efficient against Fatigue, author Alfred Ostertag, published in the proceedings of the Eighth International Conference on Shot Peening in Garmisch–Partenkirchen, Germany, Sep. 16, 2002.

* cited by examiner

2024-T351 ALUMINUM FRICTION STIR WELDMENT
WELD SIDE SURFACE

HIGH CYCLE FATIGUE RESULTS FOR
2219 T8751 ALUMINUM STIR WELD SPECIMENS

FIG. 9.

APPARATUS AND METHOD FOR FORMING WELD JOINTS HAVING COMPRESSIVE RESIDUAL STRESS PATTERNS

CROSS REFERENCE TO RELATED APPLICATIONS

This application claims the benefit of U.S. Provisional Application No. 60/335,739, filed Nov. 2, 2001.

BACKGROUND OF THE INVENTION

1. Field of the Invention

This invention relates to an apparatus and a method for forming weld joints having improved material properties and, more particularly, to a method of forming weld joints that induces residual compressive stress patterns to improve the material properties of the weld joint.

2. Description of Related Art

In the manufacture and construction of many types of structures, welding, such as gas welding, arc welding, resistance welding, thermite welding, laser welding, and electron-beam welding, has reduced or replaced the use of various types of fastening methods, such as bolting, riveting and the like. Such welding techniques either involve the complete fusion of material proximate to the weld joint thereby forming a liquid state which subsequently solidifies producing altered microstructures and properties, or the techniques involve a solid state welding process, which also produces a highly altered metallurgical state. The particular welding process best suited to joining two pieces of metal depends on the physical properties of the metals, the specific use to which they are applied, and the production facilities available.

Figure 1:
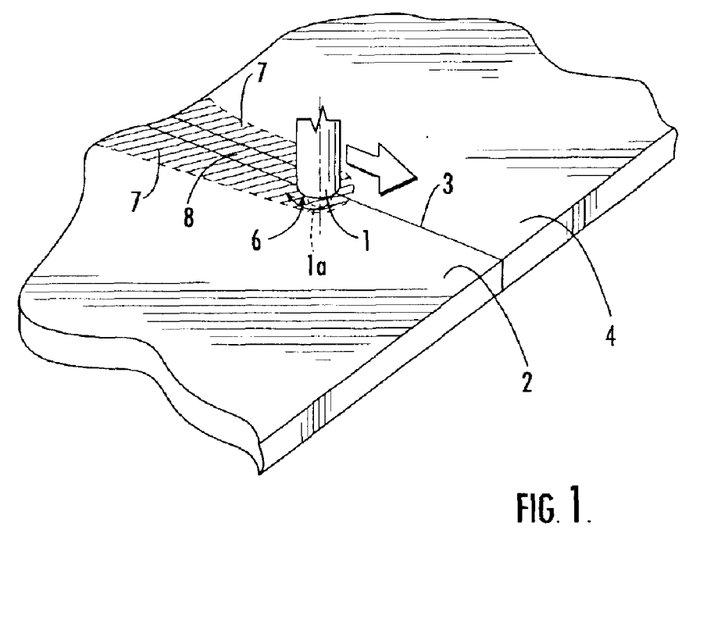
FIG. 1 is a perspective view illustrating the joining of two structural members or workpieces using friction stir welding, as is known in the art.

Friction stir welding is a relatively new welding process for joining together workpieces of metallic materials and has been used in the aerospace, automotive, marine, construction, and other industries in the manufacture of equipment, structures, and the like. As illustrated in FIG. 1, friction stir welding involves inserting the threaded pin 1a of a rotating friction stir welding tool 1 between the opposing faces of a pair of workpieces 2, 4 while urging the workpieces together. Friction stir welding can also be used to repair cracks or other defects in a single workpiece. The rotation of the threaded pin 1a between the opposing faces of the workpieces 2, 4, or within a single workpiece, creates friction that generates sufficient heat energy to plasticize the workpiece material in the weld zone 6. The friction stir welding tool 1 also includes a shoulder that can have a variety of configurations adapted to consolidate the plasticized workpiece material within the weld zone 6 as the friction stir welding tool is moved along the interface 3 between workpieces or through a single workpiece. A friction stir weld joint 8 forms, joining the workpieces together in a unitary assembly, as the plasticized regions of the workpieces 2, 4 flow together and cool in the weld zone 6. See U.S. Pat. No. 5,460,317 to Thomas et al. for a general discussion of friction stir welding, the entire contents of which are incorporated herein by reference.

One particular benefit of friction stir welding is that the formation of the weld joint 8 is autogenous and is created by the cooling of the plasticized parent materials rather than a filler material, as is commonly used in conventional welding processes. In addition, the friction stir weld joint 8 comprises a nugget having a refined grain structure with grains having an equiaxed shape and grain sizes ranging in order of magnitude from approximately 0.0001 to 0.0002 inches (approximately 3 to 5 microns). As a result of the improved grain structure, the friction stir weld joint 8 resists the formation and propagation of micro-cracks and exhibits improved strength, ductility and toughness, as well as improved corrosion and fatigue resistance.

Unfortunately, several significant problems have limited the application of welding for certain manufacturing processes. One problem generally associated with welding is that the temperature required to melt or plasticize the parent materials typically degrades the material properties of the materials. For example, as shown in FIG. 1, during friction stir welding, the frictional heat created by the rotating friction stir welding tool 1 is conducted from the weld zone 6 through the workpieces 2, 4 into the ambient environment, creating a heat-affected region 7 around the weld zone 6. The elevated temperatures associated with the friction stir welding process can degrade the material properties of the parent materials, including the strength, stiffness, and ductility of the workpieces 2, 4. In addition, the thermal transient created in the workpieces during friction stir welding can result in the weld zone 6 becoming more sensitive to corrosive attack.

Another common problem associated with welding is the formation of tensile residual stresses in the workpieces during the welding process. The tensile residual stresses form as a result of the expansion and then contraction of the regions of the workpieces or workpiece adjacent to the weld joint. Such tensile residual stresses are known to reduce both fatigue life and increase sensitivity to corrosion-fatigue and stress-corrosion cracking in a wide variety of materials. It also has been found that micro-segregation kinetics found in some aluminum alloys, which are commonly used in the aircraft industry, are sufficiently rapid such that stress-corrosion resistance is reduced even after a short thermal transient. Further, where two different workpieces that have different sizes or that comprise different materials are welded together, any residual stress can be amplified due to the difference in heat capacity between the two workpieces.

Another problem associated with many fusion and solid state welding processes is the production of "flash" or excess material at the edge of the weld joint. Fatigue crack initiation can occur out of this area due to the mechanical discontinuity at the edge or "toe" of the weld. This edge or "toe" has been found, in virtually all types of welds, to be the area where the highest tensile residual stresses are found.

In seeking to minimize the degradation of the material properties of fusion and solid state weld joints, several alternative approaches have been proposed. For example, while acceptable corrosion resistance can be achieved by a post-weld heat treatment, e.g., a solution treatment at a predetermined temperature schedule with aging at a second predetermined temperature schedule, post-weld heat treatments are not economically and technically practical except for all but the smallest and simplest of geometric shapes. Further, local heating can result in distortion and increase tensile residual stresses elsewhere in the workpiece.

Other proposed techniques for improving corrosion resistance of a weld joint have included applying a coating, such as paint, electroplating or galvanizing, to all susceptible surfaces of the resulting assembly, including the weld joint. However, such coatings require a second manufacturing operation, which can increase the labor and material cost and production time of the finished assembly. Further, such coatings provide only a superficial protective layer and do not protect surfaces of the assembly that cannot be accessed. In addition, protection of the assembly surface is lost if the coating is broken or deteriorates during service.

Methods of inducing compressive stresses along the surfaces of a workpiece have been used to improve the fatigue life and corrosion resistance of workpiece surfaces. However, such methods for inducing compressive stress in a prescribed pattern along a weld joint or induced along the surface of the resulting welded assembly have not been used or contemplated as a facet of the welding process, since the process for inducing a compressive stress could result in damage or weakening of the weld joint. One such method for inducing a layer of compressive stress in the surface of a workpiece to improve its fatigue life and corrosion resistance is burnishing. The accepted practice for burnishing utilizes repeated deformation of the surface of the part, in order to deliberately cold work the surface of the material to increase the yield strength. Compressive stresses are developed by yielding the surface of the material in tension so that it returns in a state of compression following deformation. However, excess cold working can produce tensile surface residual stresses or spalling damage and can leave the surface susceptible to overload and thermal relaxation.

Other methods commonly used to induce compressive stress in the surface of a workpiece include shot peening, whereby a plurality of metallic or ceramic pellets are projected mechanically or through air pressure to impinge the surface of a workpiece, and gravity peening, whereby pellets are dropped through a chute from a predetermined distance onto the surface of the workpiece. While shot peening and gravity peening may be used for inducing compressive residual stresses along the surface of the weld joint, unfortunately, shot peening and gravity peening also impart an uncontrolled amount of cold work making it difficult to optimize the material properties of the weld joint. Further, the degree of cold working of the material by shot peening or gravity peening is relatively high, which may be undesirable for many applications. In addition, the shot or gravity peening induced compressive residual stresses are relatively shallow, affording little benefit in arresting fatigue or stress corrosion cracks since the shallow compressive layer may be lost to wear or corrosion in service thereby providing little beneficial effects. Shot peening and gravity peening also produce a poor surface finish making the processes unacceptable for many applications. It is also known that the beneficial effects produced by shot peening or gravity peening are generally lost as the pattern of compression relaxes with time, particularly when subjected to elevated temperatures during service.

In addition to material property degradation and the formation of tensile residual stresses, another problem associated with assemblies formed using both solid state and fusion welding techniques is the creation of relatively rough surface finishes. For example, the rubbing and rotation of the shoulder of the friction stir welding tool along the surface of the workpiece typically creates a relatively rough surface finish having a periodic circular pattern. Surface roughness is generally unacceptable for structures used in fatigue loading applications. Accordingly, in order to reduce surface roughness, the travel speed of the rotating friction stir welding tool is often decreased. However, decreasing the travel speed of the tool can significantly increase welding time. Surface roughness of a workpiece also can be reduced by post-weld machining. However, post-weld machining can thin the weld joint and requires a relatively labor-intensive and time-consuming secondary manufacturing operation, which will increase the cost and production time of the finished assembly. In addition, due to the differences in material hardness proximate to the weld joint that result from the soft heat affected zone, it can be difficult to prevent local undercutting when performing the post-weld machining, which can result in fatigue initiation sites.

It should now be apparent that until now, in addition to the problems identified above, all post welding procedures have required a second-pass operation that typically increases the labor and/or material cost and production time of the finished assembly. Consequently, there remains a need for improved methods and apparatus for reducing material property degradation, tensile residual stresses, and surface roughness when forming a weld joint. Such manufacturing methods and apparatus should provide reduced labor costs and production times over conventional methods and should provide a weld joint having improved mechanical and chemical properties, including corrosion resistance, yield strength, hardness, ductility, fatigue life, and surface finish.

SUMMARY OF THE INVENTION

The present invention provides structural assemblies having weld joints and workpieces with improved material properties and surface finishes and methods and apparatus for forming the same. According to one embodiment of the present invention, a structural assembly is provided that includes at least one workpiece and a weld joint disposed along at least a portion of the surface of the workpiece. In one embodiment, the weld joint is formed from gas welding, arc welding, resistance welding, thermite welding, laser welding, or electron-beam welding. In another embodiment, the weld joint comprises a friction stir weld joint. Advantageously, at least a portion of the surface of the weld joint and the surface of the workpiece adjacent the weld joint comprise a selectively formed layer of residual compressive stress to thereby improve the corrosion resistance and fatigue strength of the portion of the surface of the weld joint and the surface of the workpiece. In one embodiment, the layer of residual compressive stress has a predetermined pattern. In another embodiment, the portion of the surface of the weld joint and the surface of the workpiece comprising the selectively formed layer of residual compressive stress exhibit an amount of cold working less than about five percent (5%) and, more preferably, less than about two percent (2%). The workpiece can be formed of a variety of materials, including, but not limited to aluminum, an aluminum alloy, copper, a copper alloy, titanium, or a titanium alloy. In another embodiment, the structural assembly includes first and second workpieces that are formed of different metals.

The present invention also provides a method of forming a weld joint. According to one embodiment of the present invention, the method includes welding at least one workpiece along a predetermined path to form the weld joint. The welding step can include gas welding, arc welding, resistance welding, thermite welding, laser welding, electron-beam welding, or friction stir welding. A layer of residual compressive stress is induced in at least a portion of the surface of the weld joint and the surface of the workpiece adjacent the weld joint. In one embodiment, the welding and inducing steps are performed concurrently. In another embodiment, the method includes controlling the amount of cold working and surface hardening in the portion of the surface of the weld joint and the surface of the workpiece adjacent the weld joint. For example, in one embodiment, the amount of cold working is less than about five percent (5%) and, more preferably, less than about two percent (2%) percent. In another embodiment, the inducing step comprises burnishing. In another embodiment, the inducing step comprises passing a compression tool across the weld joint in a predetermined pattern to thereby define zones of residual compressive stress that do not substantially overlap. In another embodiment, the method includes performing X-ray diffraction to determine a desired compressive stress pattern to be induced within the surface of the weld joint and the surface of the workpiece adjacent the weld joint. In another embodiment, the inducing step comprises controlling the direction of motion and/or the speed of motion of a compression tool across the weld joint. In yet another embodiment, the inducing step comprises adjusting the force being applied by the compression tool against the weld joint and the surface of the workpiece adjacent the weld joint. In still another embodiment, the method includes removing flash from the weld joint.

The present invention also provides a welding apparatus. According to one embodiment of the present invention, the welding apparatus includes a welding tool for forming a weld joint along the surface of at least one workpiece. The welding tool can be structured to perform gas welding, arc welding, resistance welding, thermite welding, laser welding, or electron-beam welding. In another embodiment, the welding tool comprises a rotatable spindle and a friction stir welding tool in rotatable communication with the spindle. The welding apparatus also includes a compression tool for selectively inducing a layer of residual compressive stress in at least a portion of the surface of the weld joint and the surface of the workpiece. In one embodiment, the compression tool comprises a single-point burnishing tool. The welding apparatus can include a controller in operable communication with the compression tool, wherein the controller is structured to automatically control the direction of motion and/or speed of motion of the compression tool across the weld joint. In yet another embodiment, the welding apparatus includes at least one sensor structured to measure the force being applied by the compression tool against the weld joint and the surface of the workpiece adjacent the weld joint. The welding apparatus can include a controller in electrical communication with the sensor and in operable communication with the compression tool, wherein the controller is structured to automatically adjust the force being applied by the compression tool against the weld joint and the surface of the workpiece adjacent the weld joint. In still another embodiment, the welding apparatus includes a cutting tool for removing flash from the weld joint, wherein the cutting tool is attached to the compression tool.

Accordingly, the present invention provides structural assemblies having weld joints with improved material properties and surface finishes and methods and apparatus of forming the same. The manufacturing methods and apparatus of the present invention provide reduced labor costs and production times over conventional methods and provide a weld joint having improved mechanical and chemical properties, including corrosion resistance, yield strength, fatigue life, and surface finish.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate certain exemplary embodiments and which are not necessarily drawn to scale, wherein.

DETAILED DESCRIPTION OF THE INVENTION

The present invention now will be described more fully hereinafter with reference to the accompanying drawings, in which some, but not all, embodiments of the invention are shown. This invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 8:
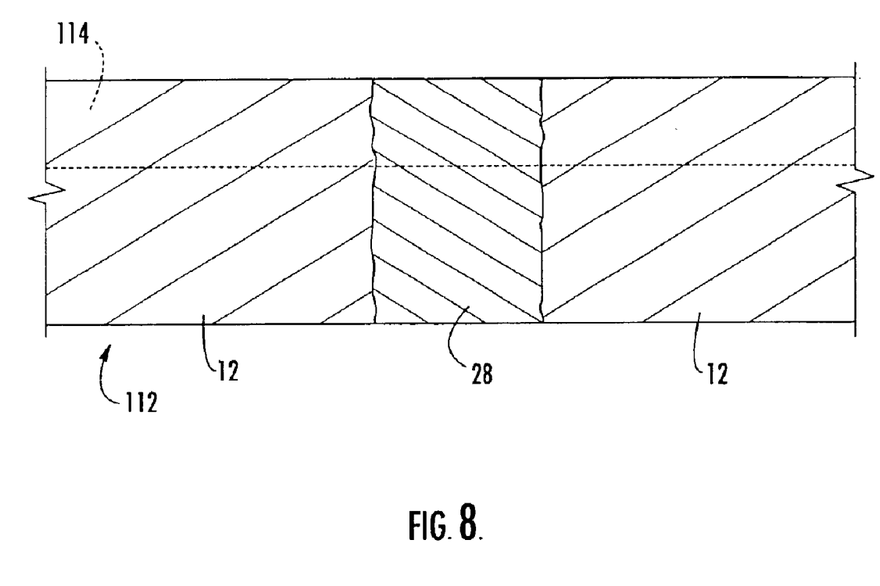
FIG. 8 is a partial cross-sectional view taken along lines 8—8 of FIG. 3, illustrating a welding joint and workpiece of a structural assembly, according to one embodiment of the present invention.

Referring to the drawings and, in particular to FIG. 8, there is illustrated a structural assembly 112, according to one embodiment of the present invention. The structural assembly 112 can be used in a variety of applications, including, but not limited to, automobiles, aerospace vehicles, construction applications, marine applications, and the like. The structural assembly 112 includes one or more workpieces 12 and at least one weld joint 28 disposed along at least a portion of the surface of one of the workpieces. The weld joint 28 is formed using any conventional welding process including, but not limited to, gas welding, arc welding, resistance welding, thermite welding, laser welding, ultrasonic welding, electron-beam welding, metal inert gas welding, tungsten inert gas welding, friction stir welding, inertia welding, or linear friction stir welding.

Figure 3:
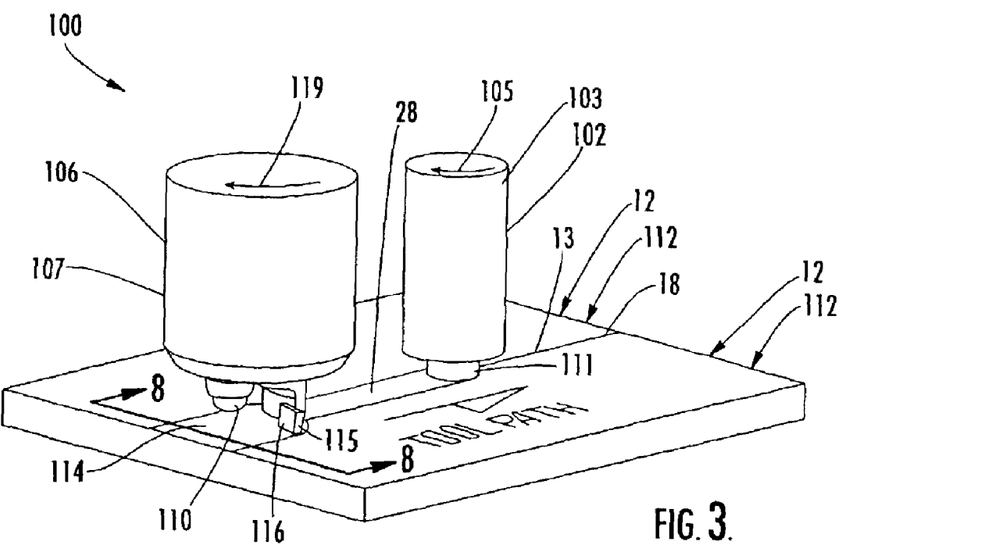
FIG. 3 is a perspective view illustrating a welding apparatus, according to one embodiment of the present invention.

As illustrated in FIGS. 3 and 8, the structural assembly 112 can include a pair of workpieces 12 positioned adjacent to one another so as to define a joint interface 13 therebetween, wherein the weld joint 28 is disposed along at least a portion of the interface to thereby join the workpieces together. In other embodiments (not shown), three or more workpieces 12 may be joined together or a weld joint 28 can be formed in a single workpiece 12 to repair a crack or other defect. A weld joint 28 and, in particular a friction stir weld joint, also can be formed to create a region of refined grain structure within a second region of a workpiece having comparatively high operational stress, as described in U.S. Pat. No. 6,398,883 entitled "Friction Stir Grain Refinement of Structural Members" which is assigned to one of the assignees of the present invention and is incorporated herein by reference.

Each workpiece 12 can be machined, through known manufacturing means, from a single workpiece into a predetermined shape and thickness as required by the specific design loads and specifications. For example, a CNC milling machine can be used to machine each workpiece 12, as necessary. The workpieces 12 can be manufactured in a variety of configurations, including, for purposes of example only and not limitation, plates, blocks, tubular members and curvilinear members. Similarly, each workpiece 12 can be formed of a variety of materials, as required by the specific design loads and specifications. The workpieces 12 are preferably formed of materials having high strength to weight ratios, including, for purposes of example only and not limitation, aluminum, aluminum alloys, titanium, and titanium alloys.

When two or more workpieces 12 are used, the workpieces can be formed of either similar or dissimilar metals. Advantageously, since the workpieces 12 may be joined by friction stir welding, the workpieces can be formed of dissimilar metals that would be unweldable or uneconomical to join by conventional fusion welding techniques. Unweldable materials, when joined by conventional fusion welding techniques, produce relatively weak weld joints that tend to crack during weld solidification. Such materials include aluminum and some aluminum alloys, particularly AA series 2000 and 7000 alloys. The use of friction stir welding permits workpieces 12 formed of unweldable materials to be securely joined. Friction stir welding also can be used to securely join weldable materials to other weldable and to unweldable materials. Thus, the method of the present invention permits the materials that form the workpieces 12 to be chosen from a wider variety of light weight, high strength metals and alloys, thereby facilitating reduction of the overall weight of the resulting welded structure. Weight and strength are of critical concern in the aerospace industry.

As illustrated in FIG. 8 and as discussed more fully below, the structural assembly 112 is formed such that at least a portion of the surface of the weld joint 28 and the surface of the workpiece 12 adjacent the weld joint comprise a selectively formed layer 114 of residual compressive stress. According to one embodiment, the selectively formed layer 114 of residual compressive stress has a depth of approximately 0.5 mm to approximately 1.5 mm. As used herein, the term "workpiece" can refer to one or more workpieces 12. Preferably, the portion or portions of the surface of the workpiece 12 adjacent the weld joint 28 that contain the selectively formed layer 114 of residual compressive stress substantially comprise the heat affected regions of the workpiece, which regions are a result of the heat generated when forming the weld joint. Where the weld joint 28 penetrates the entire thickness of the workpiece 12, a layer 114 of residual compressive stress can be induced in both sides of the workpiece.

Figure 5:
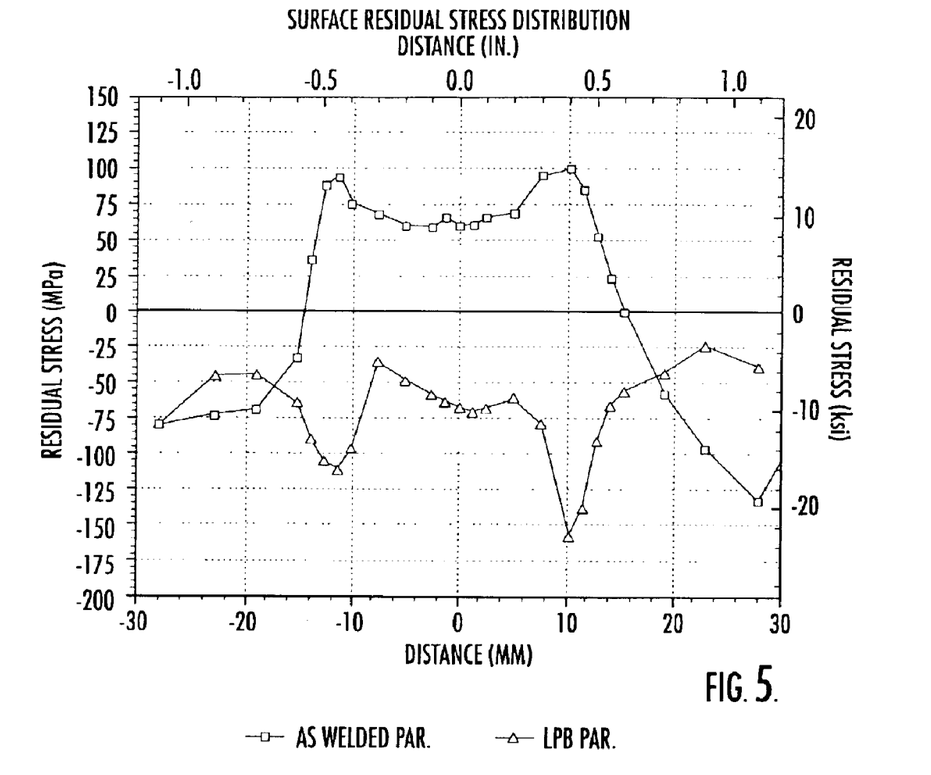
FIG. 5 is a graph comparing the surface residual stress distribution induced in the surface of a workpiece welded according to a method of the present invention and the surface residual stress distribution induced in the surface of a workpiece using conventional welding.
Figure 9:
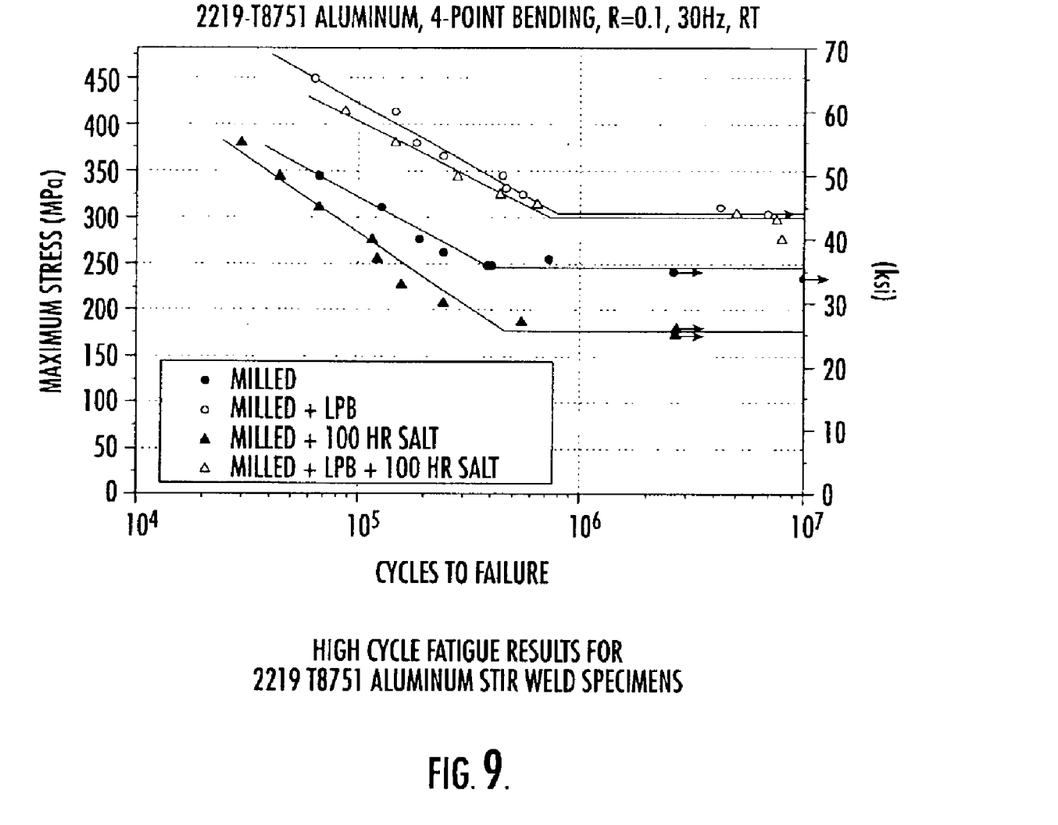
FIG. 9 is a graph comparing the fatigue life of friction stir welded aluminum samples with and without the selectively formed layer of residual compressive stress in a corrosive and non-corrosive environment using a 4-point bending test.

Referring to FIG. 5, there is illustrated a graph comparing the surface residual stress distribution selectively induced in the surface of a workpiece 12 welded by friction stir welding, according to one embodiment of the present invention, and the surface residual stress distribution induced in the surface of a workpiece 12 using conventional friction stir welding. Advantageously, it has been found by the inventors of the present invention that the layer 114 of residual compressive stress materially improves the corrosion resistance and fatigue strength of the corresponding portions of the surface of the weld joint 28 and the surface of the workpiece 12 thereby overcoming problems associated with conventional welding techniques, i.e., material property degradation, including reduced corrosion resistance and fatigue strength, and tensile residual stresses. For example, as illustrated in FIG. 9, friction stir welded aluminum test samples having a selectively formed layer of residual compressive stress, which are denoted in FIG. 9 as the test samples "+LPB," have a comparatively higher fatigue life in both a corrosive (3.5% NaCl solution) and non-corrosive environment than samples without the selectively formed layer of residual compressive stress.

Figure 2:
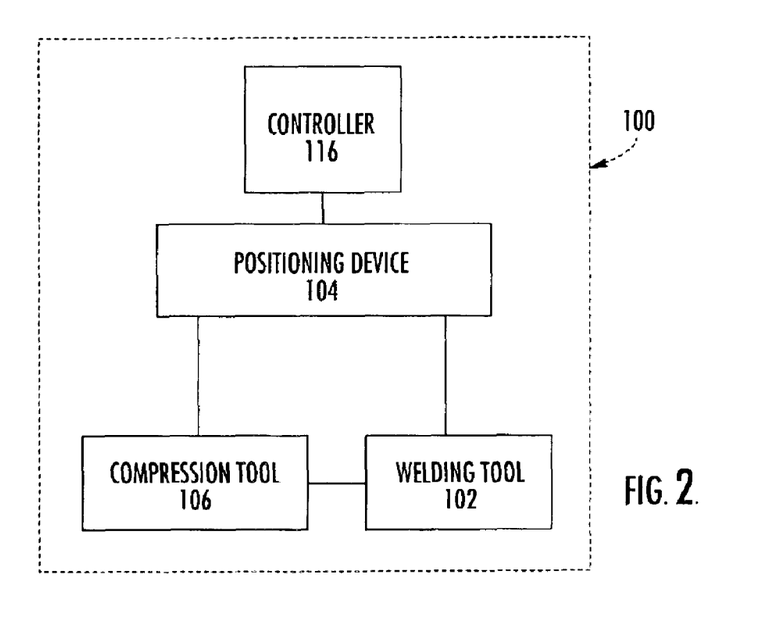
FIG. 2 is a schematic illustrating a welding apparatus for implementing the method of forming a weld joint, according to one embodiment of the present invention.
Figure 4:
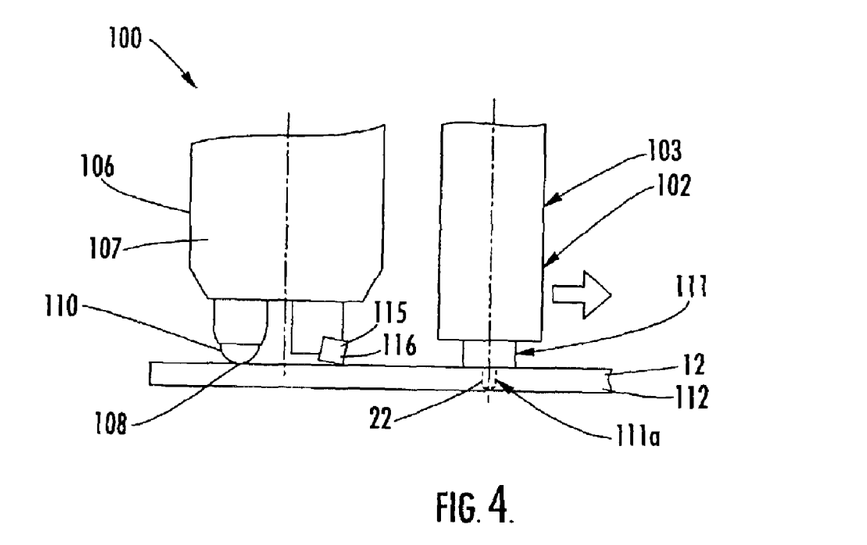
FIG. 4 is an elevation view illustrating the welding apparatus of FIG. 2.

Referring to FIGS. 3 and 4, there is illustrated a welding apparatus 100 for forming the structural assembly 112, according to one embodiment of the present invention. The welding apparatus 100 includes one or more welding tools 102 and a compression tool 106. Each welding tool 102 has a weld head structured to perform any conventional welding operation, including, but not limited to, gas welding, arc welding, resistance welding, thermite welding, laser welding, ultrasonic welding, electron-beam welding, metal inert gas welding, tungsten inert gas welding, friction stir welding, inertia welding, or linear friction stir welding. As schematically illustrated in FIG. 2, the welding tool 102 preferably is mounted to a positioning device 104, such as a robotic arm (not shown).

In one embodiment, as illustrated in FIG. 4, the positioning device 104 includes a CNC machine or milling machine (not shown) having a rotatable spindle 103, which rotates about the axis of the spindle, as illustrated by the arrow 105 in FIG. 3. The welding tool 102 can comprise a friction stir welding tool 111 that is in rotatable communication with the spindle 103. As discussed above, the friction stir welding tool 111 includes a shoulder and a pin 111a structured to plasticize and forge the portions of the workpiece or workpieces 12 adjacent the pin to thereby form a solid state weld joint 28. In one embodiment, the friction stir welding tool 111 is heated using one or more heaters (not shown) prior to and during formation of the weld joint 28 to transfer heat to the pin 111a. Methods and apparatus for heating a friction stir welding tool 111 through convection, conduction, irradiation, or induction are described in U.S. patent application Ser. No. 10/035,865 entitled "High Strength Friction Stir Welding," which is assigned to one of the assignees of the present invention and is incorporated herein by reference.

The welding apparatus 100 further comprises a compression tool 106 for selectively producing a zone of deformation or layer 114 of residual compressive stress, as illustrated in FIG. 8, along the surface of the weld joint 28 and the surface of the workpiece 12 adjacent the weld joint. While various compression tools have been developed for inducing a layer of residual compressive stress 114 in the surface of a workpiece, preferably, the compression tool 106 is a burnishing tool 107. For example, the burnishing tool 107 can include a single-point burnishing tool, such as the one described in U.S. Pat. No. 5,826,453 entitled "Burnishing Method and Apparatus for Providing a Layer of Compressive Residual Stress in the Surface of a Workpiece," which is incorporated herein by reference. As illustrated in FIGS. 3 and 4, the single-point burnishing tool 107 includes a burnishing ball 110, the forward most tip 108 of which is caused to pass over the weld joint 28 and the portions of the workpiece 12 adjacent the weld joint in a rolling motion to induce deep compression. As schematically illustrated in FIG. 2, the compression tool 106 preferably is mounted to a conventional positioning device 104, such as a robotic arm or milling machine (not shown).

The welding apparatus 100 also can include a cutting tool 115 structured to remove flash from the weld joint 28 and the surface of the workpiece 12 adjacent to the weld joint to thereby provide a structural assembly 112 having a relatively smooth finished surface. According to one embodiment, as illustrated in FIGS. 3 and 4, the cutting tool 115 comprises a cutting bit 116 attached to the compression tool 106. As the compression tool 106 rotates, as indicated by the arrow 119 in FIG. 3, the cutting tool 115 rotates about the surface of the weld joint 28 and the surface of the workpiece 12 removing flash.

The direction of motion and speed of the welding tool 102 and the compression tool 106 along the weld line 18 defined by the joint interface 13 will depend upon the type of weld joint 28 being formed along the surface of the workpiece 12 and the desired depth of the layer 114 of residual compressive stress. The force applied by the compression tool 106 to the surface of the weld joint 28 and the surface of the workpiece 12 adjacent the weld joint likewise will depend on the desired depth of the layer 114 of residual compressive strength. In addition, where the weld joint 28 is a friction stir weld joint, the force applied by the friction stir welding tool 111 against the workpiece 12 will depend on the material composition, material properties, and dimensions of the workpiece.

The welding apparatus 100 of the present invention can be manually or automatically operated. As schematically illustrated in FIG. 2, the welding apparatus 100 can include a controller 116 for automatically controlling the positioning device 104 and, thus, the direction of motion and speed of the welding tool 102 and the compression tool 106. The controller 116 also can be used to control the force applied by the compression tool 106 to the surface of the weld joint 28 and the surface of the workpiece 12 adjacent the weld joint. Similarly, where the weld joint 28 comprises a friction stir weld joint, the controller 116 can be used to control the force applied by the friction stir welding tool 111 against the workpiece 12. The controller 116 can include a microprocessor, such as a computer operating under computer software control. In one embodiment, the positioning device 104 includes belt and/or gear drive assemblies (not shown) powered by servomotors (not shown), as is known in the art. The controller 116 can be in operable communication with the servomotors of the positioning device 104 through suitable wiring (not shown).

One or more sensors (not shown), including, but not limited to, linear variable differential transformers or laser, capacitive, inductive, or ultrasonic displacement sensors, which are in electrical communication with the controller 116 through suitable wiring, can be used to measure the spacing of the tooling above the surface of the workpiece 12, and, thus, the motion of the welding tool 102 and the compression tool 106. Similarly, shaft encoders in servo systems, stepper motor drives, linear variable differential transformers, or resistive or optical positioning sensors can be used to determine the position of the tool along the surface of the workpiece 12. One or more pressure sensors (not shown) including, but not limited to, load cells incorporating resistive, piezoelectric, or capacitive elements, which are in electrical communication with the controller 116 through suitable wiring, can be used to measure the amount of force applied by the compression tool 106 to the surface of the weld joint 28 and the surfaces of the workpiece 12 adjacent the weld joint. Similarly, where the welding tool 102 is a friction stir welding tool 111, one or more pressure sensors (not shown), which are in electrical communication with the controller 116 through suitable wiring, can be used to measure the amount of force applied by the welding tool to the surface of the workpiece 12. For example, pressure transducers can be used to monitor the hydraulic pressure applied by a piston to determine the normal force on the tool. The measurements obtained by the motion and pressure sensors are communicated to the controller 116. The controller 116 compares the measurements to preprogrammed parameters and, if necessary, instructs the servomotors (not shown) of the positioning device 104 to make corrections or adjustments to the direction of motion, speed of motion, and/or force being applied by the welding tool 102 and/or compression tool 106.

To join two or more workpieces 12, the workpieces are positioned relative to one another such that the workpieces define a joint interface 13 therebetween. The interface defines a predetermined path or weld line 18 for the welding apparatus 100. When repairing a crack or other defect in a single workpiece 12, the crack or defect will define the predetermined path or weld line 18. The workpieces 12 preferably are secured so as to prevent movement of the workpieces relative to one another. For instance, the workpieces 12 can be secured to each other by spot welding or using a clamp, as is known in the art. The workpieces 12 can then be secured to a worktable by means of a clamp or similar device (not shown). When forming a weld joint 28 in a single workpiece 12, the workpiece preferably is secured to a worktable by means of a clamp or similar device. The welding apparatus 100 is positioned relative to the workpiece or workpieces 12 such that the welding tool 102 and compression tool 106 are adjacent the weld line 18. The welding tool 102 is engaged and moved along the weld line 18 to weld the workpiece or workpieces 12. According to another embodiment (not shown), the welding tool 102 is fixed and the workpiece or workpieces 12 are moved relative to the welding tool.

Thereafter, the compression tool 106 is engaged and moved along the surface of the weld joint 28 and the surface of the workpiece 12 adjacent the weld joint to induce a layer 114 of residual compressive stress. According to another embodiment (not shown), the compression tool 106 is fixed and the workpiece 12 is moved relative to the compression tool. As discussed above, preferably the surface of the workpiece 12 adjacent the weld joint 28 substantially includes the heat affected regions of the workpiece resulting from the welding process. According to the embodiment illustrated in FIGS. 3 and 4, the compression tool 106 operates by forcing the burnishing ball 110 against the surface of the weld joint 28 and the surface of the workpiece 12 adjacent the weld joint to produce the zone of deformation and to induce a layer 114 of residual compressive stress.

According to another embodiment of the present invention, conventional X-ray diffraction techniques are used to analyze the weld joint 28 and the region of the workpiece 12 adjacent the weld joint to determine a desired compressive stress pattern, as well as the amount of cold working and surface hardening necessary to optimize the material properties of the weld joint and regions of the workpiece. The burnishing ball 110 can then be passed in a predetermined pattern and varying pressure, manually or using the controller 116, across the weld joint 28 and the surface of the workpiece 12 adjacent the weld joint to induce the desired residual compressive stress pattern with the desired amount of cold working and surface hardening.

Figure 7:
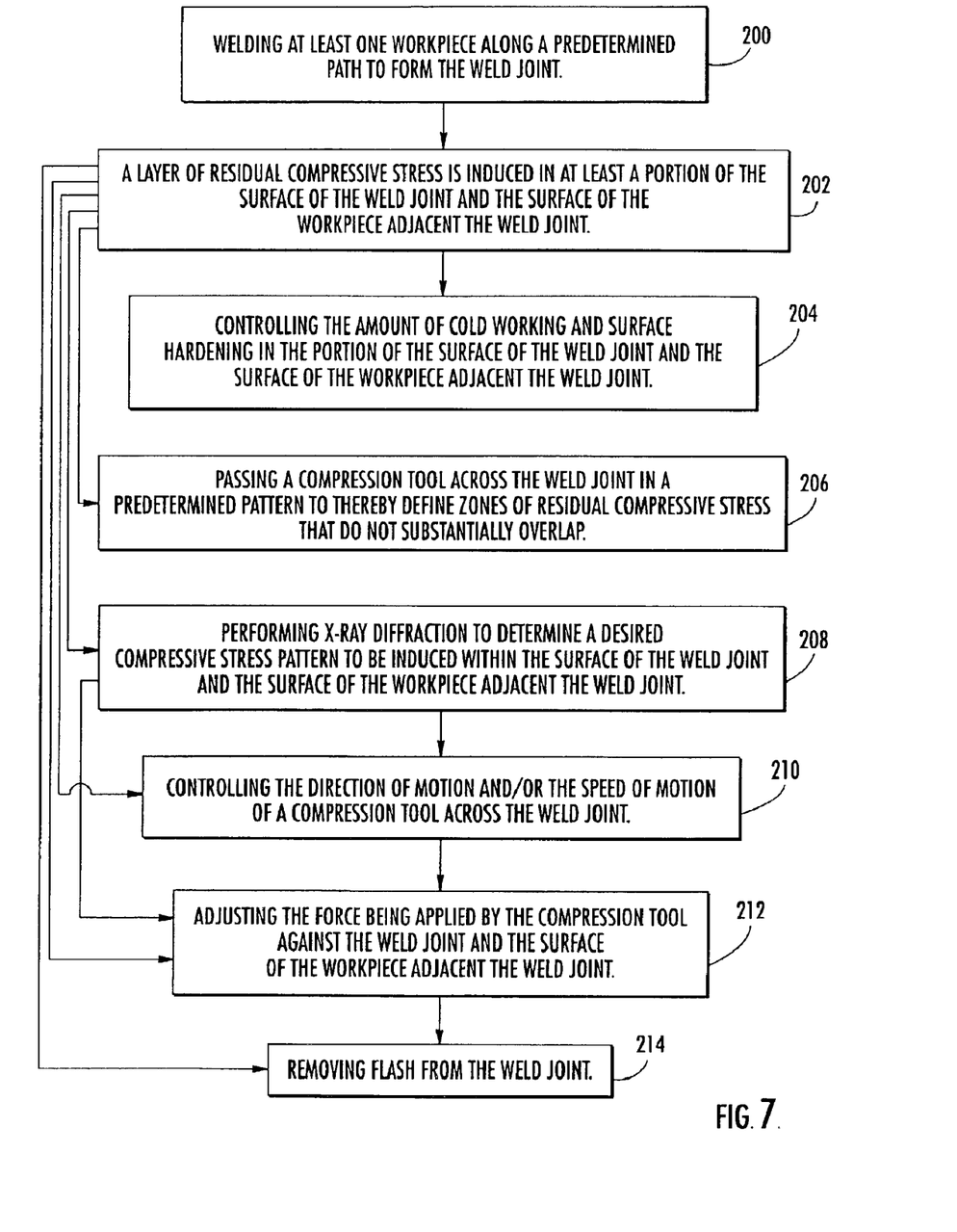
FIG. 7 is a flow chart illustrating a method of forming a weld joint, according to one embodiment of the present invention.

Referring to FIG. 7, there is illustrated the operations performed to form a weld joint, according to one embodiment of the present invention. The method includes welding at least one workpiece along a predetermined path to form the weld joint. See Block 200. The welding step can include gas welding, arc welding, resistance welding, thermite welding, laser welding, electron-beam welding, or friction stir welding. A layer of residual compressive stress is induced in at least a portion of the surface of the weld joint and the surface of the workpiece adjacent the weld joint. See Block 202. In one embodiment, the welding and inducing steps are performed concurrently. In another embodiment, the method includes controlling the amount of cold working and surface hardening in the portion of the surface of the weld joint and the surface of the workpiece adjacent the weld joint. See Block 204. For example, in one embodiment, the amount of cold working is less than about five percent (5%) and, more preferably, less than about two percent (2%). In another embodiment, the inducing step comprises burnishing. In another embodiment, the inducing step comprises passing a compression tool across the weld joint in a predetermined pattern to thereby define zones of residual compressive stress that do not substantially overlap. See Block 206. In another embodiment, the method includes performing X-ray diffraction to determine a desired compressive stress pattern to be induced within the surface of the weld joint and the surface of the workpiece adjacent the weld joint. See Block 208. In another embodiment, the inducing step comprises controlling the direction of motion and/or the speed of motion of a compression tool across the weld joint. See Block 210. In yet another embodiment, the inducing step comprises adjusting the force being applied by the compression tool against the weld joint and the surface of the workpiece adjacent the weld joint. See Block 212. In still another embodiment, the method includes removing flash from the weld joint. See Block 214.

The method of single-point burnishing applied in a single-pass or in multiple passes of reduced compressive force can be effective for producing compressive residual stresses following tensile deformation of the workpiece and to a certain depth within the weld joint 28 and the regions of the workpiece 12 adjacent the weld joint and produces deep compression with minimal cold working. It has been found that this single-point burnishing method can be used to produce a part with less cold work and surface hardening than a part subjected to conventional shot peening or gravity peening. It has also been found that the layer 114 of residual compressive stress developed, according to the present invention, penetrates to a greater depth than developed by conventional shot peening surface treatment. The amount of cold working and surface hardening also can be varied as part of the process to optimize the material properties of the weld joint 28 and regions of the workpiece 12 adjacent the weld joint. The optimal amount of cold working and surface hardening will depend on the particular material being welded and the environment which the part will be subjected to during its life. It has been found, however, that by cold working the surface of the weld joint and surface of the workpiece 12 adjacent the weld joint by less than about five percent (5%) and, more preferably, by less than about two percent (2%), results in a weld joint 28 having longer retention of residual compressive stress at elevated temperature, and less alteration of the residual stress field during tensile or compressive overload than weld joints formed using conventional cold working and surface hardening processes. It should be understood, however, that an increase in yield strength at elevated temperatures may be obtained by increasing the amount of surface cold working. This may be desirable for some applications.

Accordingly, the method and the apparatus of the present invention is a relatively inexpensive and effective means of welding which provides a compression force along a weld joint to induce compressive stress in a well-defined localized area with a controlled amount of cold working and surface hardening. FIG. 5 illustrates the surface of a part in a state of residual tension after a welding operation, in this example a friction stir welding operation, compared to the surface of the part in a state of residual compression after having been welded and then treated by the method of burnishing of the present invention. As illustrated in FIG. 5, upon welding, the surface exhibits regions in the weld zone with a relative high level of tension, thereby significantly reducing the fatigue life and stress corrosion resistance of the part.

Figure 6:
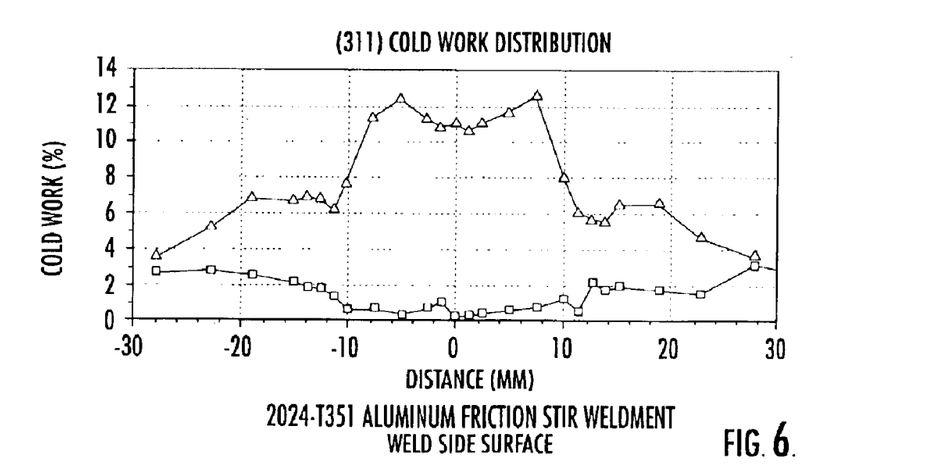
FIG. 6 is a graph comparing the percent cold work distribution for a workpiece welded according to a method of the present invention and the percent cold work distribution for a workpiece welded using conventional welding.

By minimizing the amount of cold working and surface hardening, it has been found that the method of the present invention will induce a layer 114 of residual compressive stress along the surface of the weld joint 28 and surface of the workpiece 12 adjacent the weld joint, which substantially includes the heat affected regions of the workpiece, resulting in a part having improved material properties such as fatigue strength, particularly at elevated temperature, as well as minimize the alteration of the residual stress field during tensile or compressive overload. FIG. 6 illustrates the percent cold work in the surface of a part after a friction stir welding operation, compared to the percent cold work in the surface of the part after having been welded and then treated by the method of burnishing of the present invention. For a particular application, the percentage of cold working imparted to the surface of the part can be increased over five percent (5%), such as illustrated in FIG. 6 where the amount of cold working is approximately twelve percent (12%). However, the amount of cold working can be varied depending on the material property requirements of the particular application. In this regard, it has been found that reducing the percent cold working can increase the fatigue strength of the part, whereas increasing the percent cold working can increase the yield strength of the part at elevated temperatures. For applications requiring relatively high fatigue strength, it has been found that the percent cold working preferably is less than approximately five percent (5%) and, more preferably, less than approximately two percent (2%).

As described and shown herein above, the method of forming a weld joint 28 of the present invention offers advantages over prior welding methods as it enables the finished weld joint to achieve enhanced fatigue strength and stress corrosion resistance, as illustrated in FIG. 9, while providing a good surface finish. Further, by coupling the welding process with the process of inducing a deep layer 114 of residual compressive stress with a minimal amount of cold working and surface hardening, a relatively low cost procedure requiring no expensive and/or time consuming after-weld treatments is achieved. This is particularly true for forming a weld joint 28 of the present invention using a friction stir welding process without the need to reduce the rotation speed of the friction stir welding tool 111. In addition, surface roughness is also improved without requiring a relatively expensive and time-consuming secondary operation.

It should also now be understood to those skilled in the art that the method of forming a weld joint and the apparatus for performing the method of the subject invention greatly increases the type of parts that can be economically manufactured by welding rather than by use of bolts and rivets. Such parts are particularly found in the aerospace industry, such as in the manufacture of aircraft fuselage and wing skins and supports, where weight considerations are of the upmost importance. By eliminating or reducing the use of bolts and rivets for such structures a significant weight reduction can be achieved, thus reducing fuel consumption, as well as lowering overall fabrication and maintenance time. In addition, the elimination or reduction of bolts and rivets will improve airflow around the aircraft thereby reducing aircraft noise and aerodynamic resistance.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A structural assembly, comprising:
   at least one workpiece;
   a weld joint disposed along at least a portion of the surface of said at least one workpiece; and
   wherein, at least a portion of the surface of said weld joint and the surface of said at least one workpiece adjacent the weld joint comprise a selectively formed layer of residual compressive stress having a depth of approximately 0.5 mm to approximately 1.5 mm and having an associated cold working of less than about 12 percent to thereby improve the corrosion resistance and fatigue strength of said portion of the surface of said weld joint and the surface of said at least one workpiece.

2. A structural assembly according to claim 1 wherein said layer of residual compressive stress has a predetermined pattern.

3. A structural assembly according to claim 1 wherein said weld joint is formed from a welding process selected from the group consisting of gas welding, arc welding, resistance welding, thermite welding, laser welding, and election-beam welding.

4. A structural assembly according to claim 1 wherein said weld joint comprises a friction stir weld joint.

5. A structural assembly according to claim 1 wherein said portion of the surface of said weld joint and the surface of said at least one workpiece comprising said selectively formed layer of residual compressive stress exhibits an amount of cold working less than about 2 percent.

6. A structural assembly according to claim 1 wherein said portion of the surface of said weld joint and the surface of said at least one workpiece comprising said selectively formed layer of residual compressive stress exhibits an amount of cold working is less than about 5 percent.

7. A structural assembly according to claim 1 wherein said at least one workpiece is formed of a material selected from the group consisting of aluminum, an aluminum alloy, copper, a copper alloy, titanium, and a titanium alloy.

8. A structural assembly according to claim 1 further comprising first and second workpieces, said first and second workpieces comprising different metals.

9. A structural assembly being formed by a process comprising the steps of:
   welding at least one workpiece along a predetermined path to form a weld joint; and
   inducing a layer of residual compressive stress in at least a portion of the surface of the weld joint and the surface of the at least one workpiece adjacent the weld joint having a depth of approximately 0.5 mm to approximately 1.5 mm and having an associated cold working of less than about 12 percent.

10. A structural assembly being formed according to the process of claim 9 further comprising controlling the amount of cold working and surface hardening in the portion of the surface of the weld joint and the surface of the at least one workpiece adjacent the weld joint.

11. A structural assembly being formed according to the process of claim 10 wherein the amount of cold working is less than about 2 percent.

12. A structural assembly being formed according to the process of claim 10 wherein the amount of cold working is less than about 5 percent.

13. A structural assembly being formed according to the process of claim 9 wherein said inducing step comprises burnishing.

14. A structural assembly being formed according to the process of claim 9 wherein said inducing step comprises passing a compression tool across the weld joint in a predetermined pattern to thereby define zones of residual compressive stress that do not substantially overlap.

15. A structural assembly being formed according to the process of claim 9 further comprising performing X-ray diffraction to determine a desired compressive stress pattern to be induced within the surface of the weld joint and the surface of the at least one workpiece adjacent the weld joint.

16. A structural assembly being formed according to the process of claim 9 wherein said inducing step comprises controlling at least one of the direction of motion and the speed of motion of a compression tool across the weld joint.

17. A structural assembly being formed according to the process of claim 9 wherein said inducing step comprising adjusting the force being applied by a compression tool against the weld joint and the surface of the at least one workpiece adjacent the weld joint.

18. A structural assembly being formed according to the process of claim 9 wherein said welding step comprises a welding process selected from the group consisting of gas welding, arc welding, resistance welding, thermite welding, laser welding, and electron-beam welding.

19. A structural assembly being formed according to the process of claim 9 wherein said welding step comprises friction stir welding.

20. A structural assembly being formed according to the process of claim 9 further comprising removing flash from the weld joint.

21. A structural assembly being formed by a process comprising the steps of:
   forming a friction stir weld joint along a surface of at least one workpiece; and
   concurrently with said forming step, burnishing at least a portion of the surface of the weld joint and the surface of the at least one workpiece adjacent the weld joint to thereby selectively induce a layer of residual compressive stress therein having an associated cold working of less than about 12 percent.

22. A structural assembly being formed according to the process of claim 21 further comprising controlling the amount of cold working and surface hardening in the portion of the surface of the friction stir weld joint and the surface of the at least one workpiece adjacent the friction stir weld joint.

23. A structural assembly being formed according to the process of claim 22 wherein the amount of cold working is less than about 2 percent.

24. A structural assembly being formed according to the process of claim 22 wherein the amount of cold working is less than about 5 percent.

25. A structural assembly being formed according to the process of claim 21 wherein said burnishing step comprises passing a compression tool across the friction stir weld joint in a predetermined pattern to thereby define zones of residual compressive stress that do not substantially overlap.

26. A structural assembly being formed according to the process of claim 21 further comprising performing X-ray diffraction to determine a desired compressive stress pattern to be induced within the surface of the friction stir weld joint and the surface of the at least one workpiece adjacent the friction stir weld joint.

27. A structural assembly being formed according to the process of claim 21 wherein said burnishing step comprises controlling at least one of the direction of motion and the speed of motion of a compression tool across the weld joint.

28. A structural assembly being formed according to the process of claim 21 wherein said burnishing step comprises adjusting the force being applied by a compression tool against the friction stir weld joint and the surface of the at least one workpiece adjacent the friction stir weld joint.

29. A structural assembly being formed according to the process of claim 21 further comprising removing flash from the friction stir weld joint.

* * * * *